May 13, 1952 W. A. WEBB 2,596,800
METHOD AND APPARATUS FOR DRYING CONTAINERS
Filed Aug. 5, 1947 6 Sheets-Sheet 1

INVENTOR
WELLS A. WEBB
BY Philip G. Minnis.
Hans G. Hoffmeister
ATTORNEYS

May 13, 1952 W. A. WEBB 2,596,800
METHOD AND APPARATUS FOR DRYING CONTAINERS
Filed Aug. 5, 1947 6 Sheets-Sheet 2

INVENTOR
WELLS A. WEBB

BY *Philip A. Minnis*
*Hans G. Hoffmeister*

ATTORNEYS

May 13, 1952 W. A. WEBB 2,596,800
METHOD AND APPARATUS FOR DRYING CONTAINERS
Filed Aug. 5, 1947 6 Sheets-Sheet 4

FIG_6

FIG_7

INVENTOR
WELLS A. WEBB

BY Philip G. Minnis
Hans G. Hoffmeister
ATTORNEYS

May 13, 1952     W. A. WEBB     2,596,800
METHOD AND APPARATUS FOR DRYING CONTAINERS
Filed Aug. 5, 1947     6 Sheets—Sheet 6

INVENTOR
WELLS A. WEBB
ATTORNEYS

Patented May 13, 1952

2,596,800

UNITED STATES PATENT OFFICE 2,596,800

METHOD AND APPARATUS FOR DRYING CONTAINERS

Wells A. Webb, San Jose, Calif., assignor to Food Machinery and Chemical Corporation, a corporation of Delaware Application August 5, 1947, Serial No. 766,295

9 Claims. (Cl. 34—21)

The present invention relates to a method and apparatus for automatically drying containers, especially metal containers for food products commonly known as cans.

Cans of this type, when filled with food products and sealed, are usually subjected to a sterilization process involving the application of high temperatures whereupon they are cooled by means of water or other cooling liquids. Before the cans may then be labeled or packed, they have to be appropriately dried. This may be done by storing them in heated chambers until all the moisture has evaporated. This method, however, is slow and cans allowed to dry in this manner are liable to tarnish or develop unsightly rust spots. This procedure also involves a very objectionable interruption in the continuity of the production process.

Drying devices have therefore been employed which force currents of heated air against the cans as they emerge from the cooling apparatus so as to evaporate and/or blow off the water droplets clinging to the surfaces thereof. In large establishments, however, in which great numbers of cans are continually processed, the expenditure in fuel and power required to produce air currents of sufficient force and temperature to dry the cans within a short time is considerable. Also, the application of heated air currents partly defeats the purpose and effect of the preceding operation. Moreover, certain products, such as the juices of citrus fruit do not admit of repeated application of heat and upon sterilization must quickly be cooled to, and maintained at, temperatures of 80° F. or below if the flavor of the product is to be preserved.

It is an object of the present invention to provide a method for drying cans in an efficient and inexpensive manner.

Another object is to provide an economically operating yet effective apparatus for drying cans.

Another object is to furnish an efficient apparatus of the type referred to which is of small dimensions.

Another object is to provide an apparatus for drying cans without increasing the temperature thereof.

A further object is to provide a can drying apparatus of the type employing directed air currents which operates swiftly and dependably with a minimum expenditure of power.

Another object is to provide an effective drying apparatus of the type referred to which is capable of handling a continuous procession of cans in rapid succession within a space of small dimensions.

These and other objects of the present invention will be apparent from the following description and accompanying drawings in which.

Figure 1:
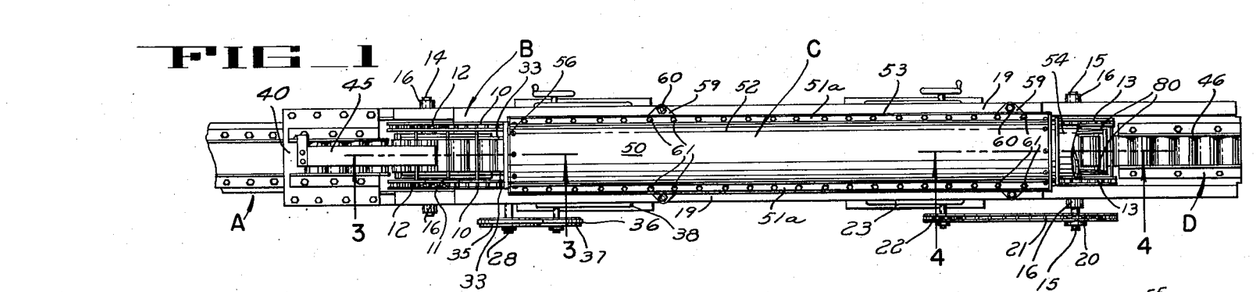
Fig. 1 is a plan view of a can drying apparatus of the present invention.

Referring to Fig. 1 a supply chute A delivers the moist cans to a conveyor arrangement B which passes them under an air distributing manifold C and drops them in dried condition into a discharge chute D.

Figure 5:
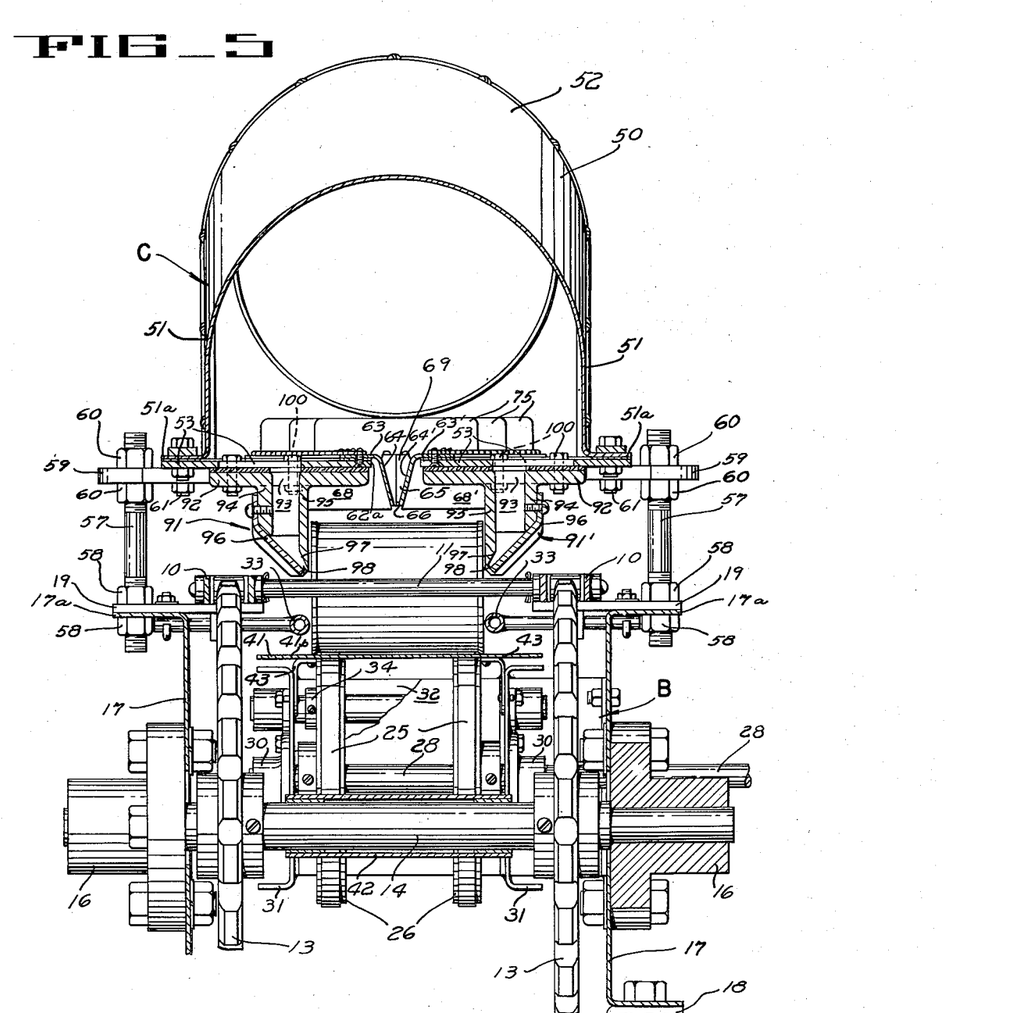
Fig. 5 is a cross-sectional view of a portion of the apparatus taken along line 5—5 of Fig. 2.
Figure 6:
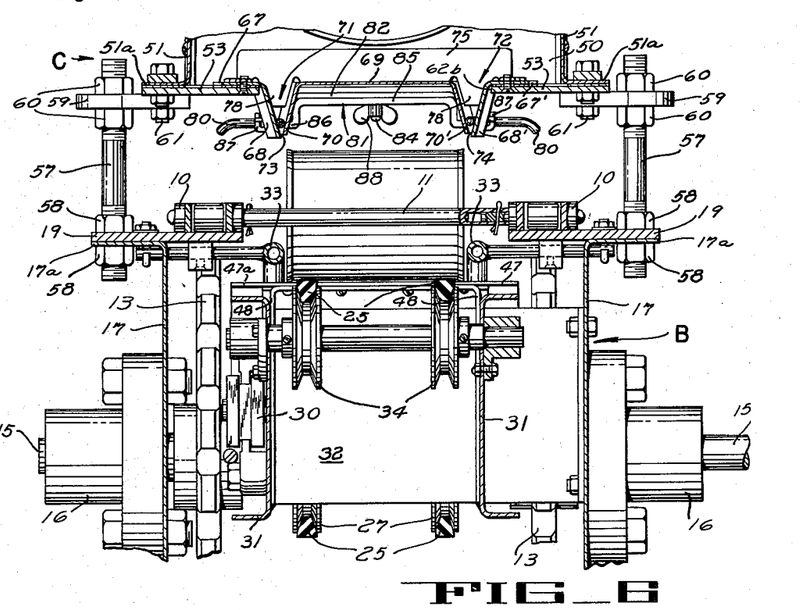
Fig. 6 is a cross-sectional view of a portion of the apparatus taken along line 6—6 of Fig. 4.
Figure 8:
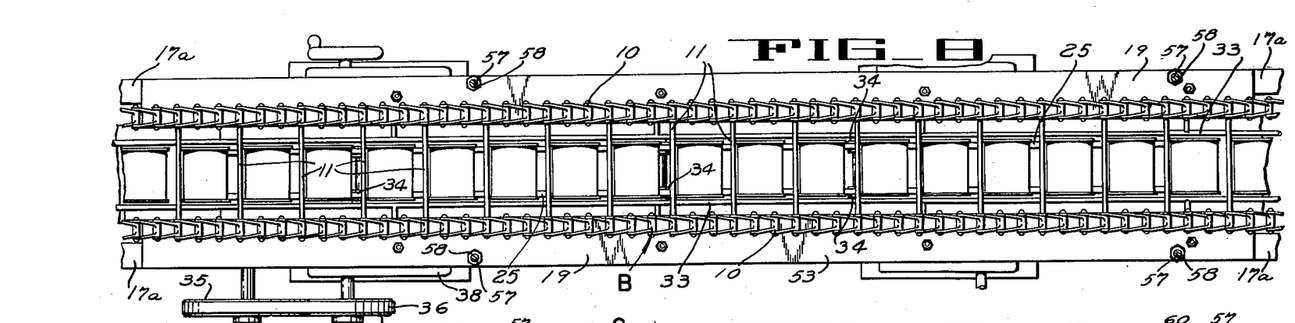
Fig. 8 is a plan view of part of the conveyor line carrying a procession of cans.
Figure 9:
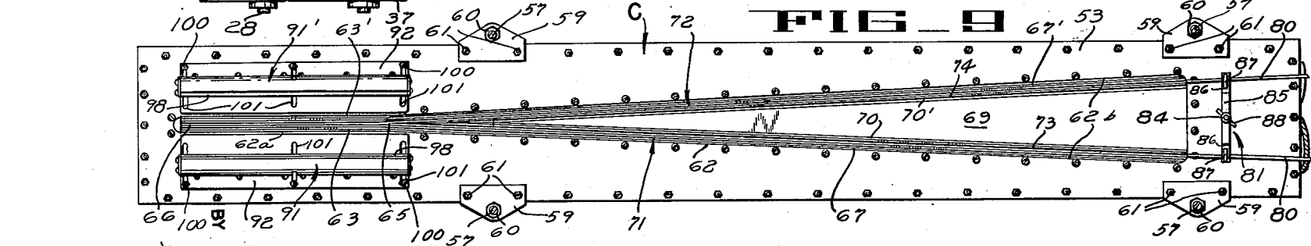
Fig. 9 is a bottom plan view of the manifold.

The conveyor arrangement (Figs. 2, 5 and 6) comprises a pair of endless sprocket chains 10 held in spaced parallel relation by a series of transverse rods 11 the opposite ends of which form, or are suitably connected to the pivots of aligned links in each of the chains 10 as shown in Fig. 6. The rods 11 are spaced from each other in such a manner as to loosely accommodate a can therebetween with the longitudinal axis of the can parallel to said rods as may best be seen from Figs. 5, 6 and 8.

Figure 2:
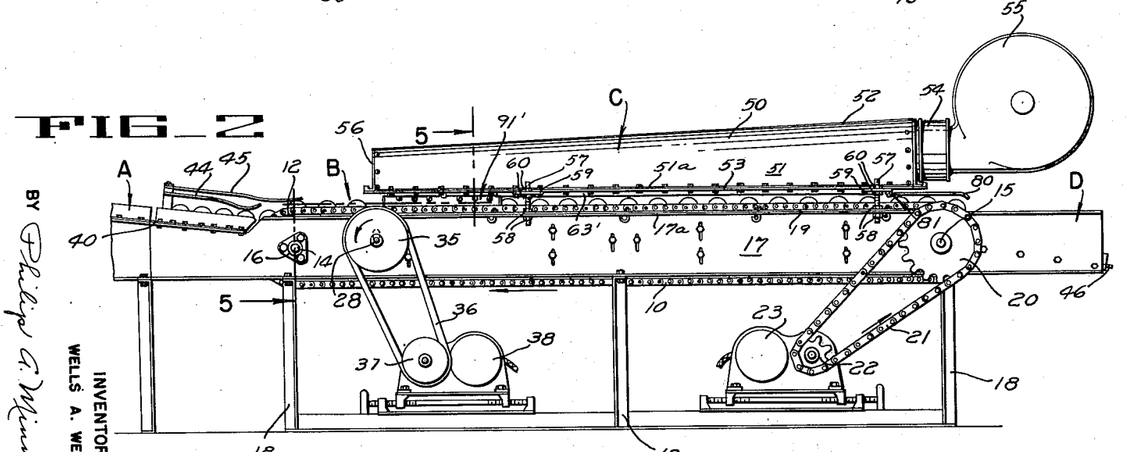
Fig. 2 is a side elevation of the can drying apparatus shown in Fig. 1.

The chains 10 are trained around two pairs of sprocket wheels 12 and 13, respectively, positioned at the supply and discharge ends of the conveyor arrangement to form an extended horizontal run as shown in Figs. 1 and 2. Each sprocket pair 12 and 13 is firmly mounted upon a transverse shaft 14 and 15, respectively, and these shafts are suitably journaled in bearings 16 supported by vertical walls 17 which in turn are mounted upon a number of uprights or standards 18 and form part of the machine frame (Figs. 5 and 6).

Each of the walls 17 have an upper outwardly directed flange 17a which carries rigidly a horizontal plate 19 extending inwardly therefrom to support the upper horizontal run of the adjacent sprocket chain 10 as may best be seen from Figs. 5 and 6.

In the particular embodiment illustrated in the drawing the shaft 15 at the discharge end of the conveyor arrangement is extended to protrude beyond one of the frame walls 17 and carries exteriorly of said wall a sprocket 20. A sprocket chain 21 (Figs. 1 and 2) operatively connects the sprocket 20 with another sprocket 22 fixed on the drive shaft of a suitable motor 23 located below the conveyor arrangement. Operation of the motor 23 will thus set the conveyor into operation.

Concentrically arranged within the chain belt 10 (Figs. 3 to 6) is a pair of parallel belts 25 trained around a pair of pulleys 26 positioned near the supply end of the conveyor arrangement and another pair of pulleys 27 positioned near the discharge end thereof. The two pulleys 26 are mounted for movement in unison upon a common transverse shaft 28 and the two pulleys 27 are mounted for movement in unison upon a common transverse shaft 29. The shafts 28 and 29 are journaled in suitable bearings 30 (Fig. 6) supported from two longitudinally extending parallel walls 31 which may be mounted upon the machine frame. Transverse partitions 32 (Figs. 3 and 4) are interposed between the confronting faces of walls 31 to impart sturdiness and rigidity to the described structure.

Figure 3:
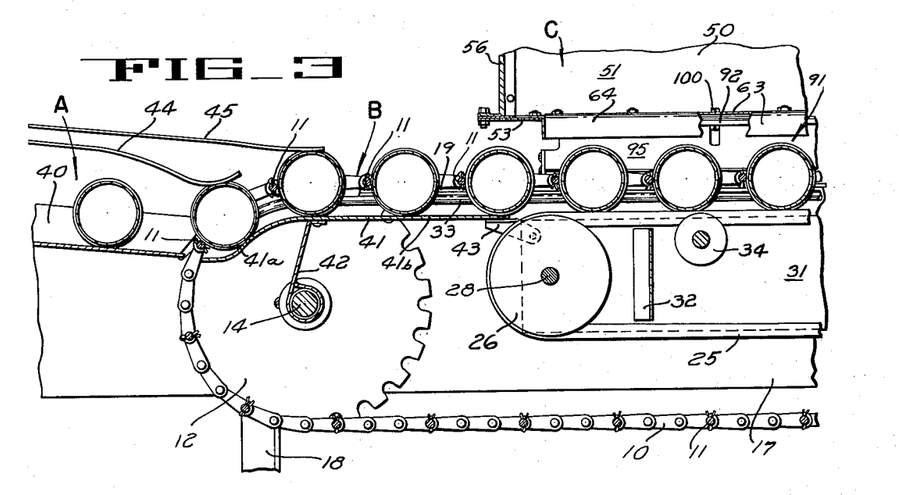
Fig. 3 is a longitudinal section of the input portion of the apparatus illustrated in Figs. 1 and 2, taken along line 3—3 of Fig. 1.

The sprocket chains 10 and the parallel belts 25 are so positioned relative to one another that the latter form horizontal runs extending below and parallel to the upper horizontal runs of the former as may best be seen from Figs. 3 and 4. The distance between the parallel belts 25 transversely of the conveyor arrangement is somewhat less than the length of the cans handled by the machine so that the cans carried along between the rods 11 of the chain belt 10 may safely rest upon the parallel runs of the two belts 25 as shown in Fig. 6. It should also be noted from Fig. 6 that the vertical distance between the chain belt 10 and the horizontal plane defined by the parallel belts 25 corresponds approximately to the radius of the cans. Thus, the horizontal plane along which the propelling rods 11 advance, intersects the can axis diametrically which minimizes the danger that a can may leap rearwardly over its propelling rod or may be wedged in between an advancing rod 11 and belts 25.

As shown in Figs. 3, 4, 5, and 6 a pair of parallel guide rails 33, suitably supported from the frame walls 17, accompanies the upper horizontal run of chain belt 10 at either side of parallel belts 25 to maintain the entrained cans in a properly centered position in which they rest safely upon the upper horizontal runs of the supporting belts 25.

To maintain the supporting belts 25 at the proper level for appropriate propelling engagement of the cans by the transverse rods 11 at places intermediate of the main pulleys 26 and 27, a series of small pulleys 34 (Figs. 3, 4 and 6) pivotally secured to the walls 31 is arranged underneath, and gives support to the upper horizontal runs of the carrier belts 25.

The transverse shaft 28 which supports the pulleys 26 near the intake end of the described arrangement is laterally extended at one end to project beyond walls 31 and 17 as shown in Fig. 5. A pulley 35 (Fig. 2) is firmly mounted upon the projecting end of said shaft 28 and is operatively connected by a belt 36 with another pulley 37 mounted upon the drive shaft of a second motor 38 located below the concentrically arranged belts 10 and 25 and adapted to drive the belts 25 in a direction opposite to that of chain belt 10.

The supply chute A delivering the moist containers from the cooling station onto the described conveyor arrangement is an inclined trough 40 terminating adjacent to the exterior upper quadrants of the sprocket wheels 12 somewhat below the culmination points thereof as may be seen by reference to Fig. 3. A bent plate 41 having an initial arcuate portion 41a and a horizontal portion 41b is held in position by a bracket 42 supported from shaft 14 and a pair of arms 43 secured to the previously mentioned parallel walls 31 to give support to the cans from the point at which they slide or drop into the spaces between consecutive rods 11 of chain belt 10 to the point where the upper runs of the parallel belts 25 assume this function. The location of the discharge end of trough 40 at rising points of the sprocket wheels 12 below the level of the upper horizontal runs of the chain belt 10 insures individual delivery of the cans onto the conveyor arrangement and prevents congestion in the supply of the cans such as might occur if an excessive number of cans would roll onto the chain belt.

Two superposed leaf springs 44 and 45 (Fig. 3) are arranged above the end of the trough. The free resilient ends of these springs terminate at different angular points relative to the axis of rotation of sprockets 12, at distances radially above the bent portion of base plate 41 corresponding approximately to the diameter of the cans. This arrangement retains the cans resiliently against base plate 41 and permits swift operation of the chain belt 10 with the cans being fed in rapid succession from the trough into the spaces between transverse rods 11 without danger of disorganization such as might occur if any of the cans might strike against, and rebound from, rods 11.

A discharge chute D in the form of an inclined trough 46 (Fig. 4) is arranged adjacent to the sprocket wheels 13 approximately at the level of the shaft 15. A bent plate 47 having an initial horizontal portion 47a and a downwardly curved rear portion 47b establishes support for the cans from the ends of the upper horizontal runs of belts 25 to points opposite to the edge of the discharge trough 46. Like the previously mentioned plate 41 at the supply end of the conveyor arrangement, the plate 47 is held in proper position by a pair of arms 48 secured to the walls 31 and a bracket 49 suitably supported from shaft 15. It should be noted that the previously mentioned guide rails 33 which accompany the chain belt 10 are turned arcuately downwards at their ends, as shown in Fig. 4, to safely conduct the cans from the conveyor arrangement into the discharge trough 46.

Disposed above the upper horizontal run of the chain belt 10 (Figs. 1 and 2) is an air distributing manifold 50 in the form of an elongated hood having vertical side walls 51 and an arched roof or ceiling 52. A floor 53 (Figs. 5 and 6) is secured to outwardly directed flanges 51a arranged at the bottom of the vertical side walls 51. The right end of the manifold 50 (as viewed in Fig. 2) is provided with a tube 54 connecting the manifold with an air blower 55 of suitable design while the left end thereof is closed off by a solid wall 56. The manifold 50 is preferably of a decreasing vertical height in the direction of the air currents produced by blower 55 which is opposite to the direction of movement of the chain belt 10.

The described manifold 50 is held in any suitable manner an appropriate distance vertically above the chain belt 10. In the illustrated embodiment the previously mentioned flanges 17a (Figs. 5 and 6) at the top of frame walls 17 are each engaged at longitudinally spaced points by vertically rising bolts 57 adjustably held in position by pairs of nuts 58. Supporting shelves such as the pentagonal plates 59 (Fig. 7) are adjustably mounted on the upper ends of each of said bolts by pairs of nuts 60 (Figs. 5 and 6). The manifold 50 rests upon, and is attached to, these pentagonal plates by means of bolts 61 which extend through the outwardly directed flanges 51a of the hood walls 51 and the edges of the floor 53. The described arrangement permits vertical adjustment of the manifold 50 relative to the level of chain belt 10 to establish optimum conditions of operation for cans of different diameters.

Figure 10:
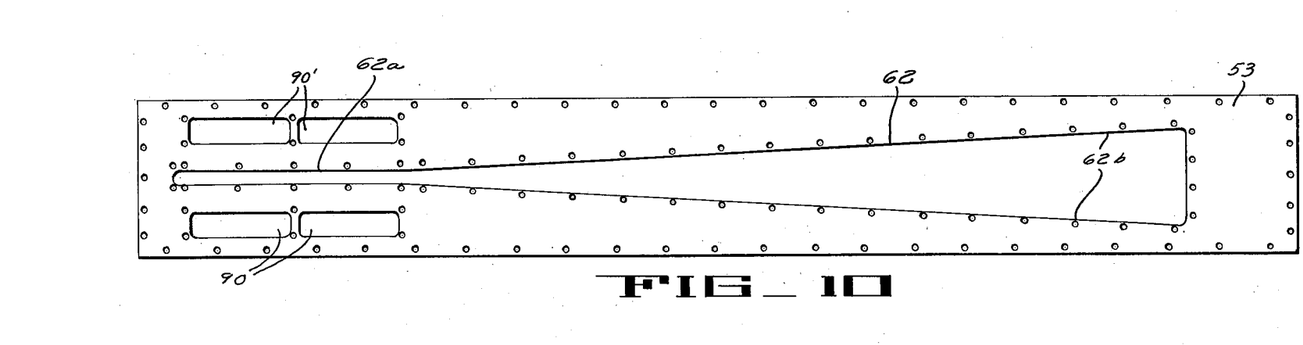
Fig. 10 is a plan view of the floor of the manifold with the various blow nozzles removed.

The floor 53 of the manifold 50 is formed by a plate of elongated rectangular shape and possesses a centrally positioned aperture 62 (Fig. 10). This aperture has a relatively short and narrow initial portion 62a formed between parallel edges but continues into a second portion 62b the edges of which diverge from one another to form an opening of elongated triangular shape.

The parallel edges of the initial portion 62a of aperture 62 carry plates 63 and 63' (Fig. 5) which are provided with obliquely depending lips 64 and 64', respectively, extending symmetrically through opening 62a and toward one another to form a wedge shaped channel 65. It should be noted, however, that the lips 64 and 64' terminate out of contact with one another and thus leave a longitudinal slot or nozzle 66 at the bottom of the channel 65.

Two plates 67 and 67' (Figs. 6 and 7) of a shape similar to plates 63 and 63' are mounted upon the diverging edges of the triangular aperture 62b and have obliquely depending lips 68 and 68', respectively. Disposed within the triangular aperture 62b is a triangular plate 69 the edges of which are parallel to the edges of the aperture and which has two depending lips 70 and 70' extending adjacent to, and having an inclination symmetrically identical with lips 68 and 68', respectively, so that two diverging channels 71 and 72 of wedge-shaped cross section are formed. However, in the preferred embodiment illustrated in the accompanying drawing the outer lips 68 and 68' are slightly extended as compared with the inner lips 70 and 70' as may best be seen from Fig. 6 with the result that the blow slots or nozzles 73 and 74 formed at the bottom of the channels 71 and 72 are turned slightly toward the center of the arrangement.

The triangular center plate 69 (Figs. 6 and 7) is supported from a number of transversely extending braces or bridges 75 the opposite ends of which are bent to form ears 76 that are detachably fastened to the horizontal rims of the plates 67 and 67', respectively. The middle portion of each bridge has a horizontal flange 77 which is suitably secured to the upper horizontal surface of the triangular plate 69. The bridges 75 may also be provided with two downwardly directed prongs 78 of truncated triangular shape which protrude into the wedge-shaped channels 71 and 72 and aid in properly centering the plate 69. It will be understood that the described bridges differ in length depending upon their position relative to the apex or base of the triangular aperture 62b.

Figure 7:
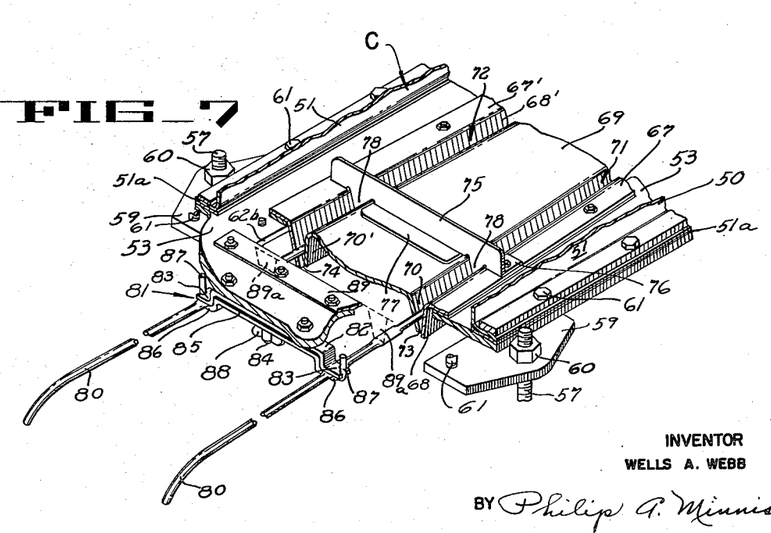
Fig. 7 is a fragmentary perspective view of the bottom part of the air conducting manifold.

Means are provided to shorten the effective length of the described blow slots 73 and 74 if desired. For this purpose a pair of rods 80 (Fig. 7) of metal tubing or the like and of a somewhat larger diameter than the width of slots 73, 74 may be arranged to extend into the wedge-shaped channels 71 and 72 at the open ends thereof. To hold the exteriorly projecting ends of these rods in their proper positions a suitable clamping device 81 is arranged underneath floor 53 near the right hand end thereof as viewed in Figs. 2, 3, and 10. This device comprises a transversely disposed bar 82 (Figs. 6 and 7) formed in the fashion of a shallow inverted U and rigidly attached to the bottom of floor 53 in any suitable manner with its ends bent outwardly to form a pair of horizontal lugs 83. The center of bar 82 is provided with a vertically depending bolt 84 which protrudes through an aperture in the center of another transverse bar 85 of such shape and dimensions as to fit into bar 82 with its end lugs 86 positioned parallel and directly below the end lugs 83 thereof. The lower lugs 86 may be provided with vertically rising guide studs 87 adapted to engage corresponding recesses arranged in the edges of the upper lugs 83 as shown in Fig. 7. A wing nut 88 engages the free protruding end of the above mentioned bolt 84 (Fig. 6) and is adapted, upon rotation, to force the lower bar 85 against the upper bar 82 so that their end lugs may firmly hold the rods 80 in place. To facilitate proper gripping of the rods between these lugs, the rods may be flattened out at certain intervals as indicated in Fig. 7. The described arrangement permits longitudinal adjustment of the rods 80 relative to channels 71 and 72 so that a greater or lesser portion of the diverging blow slots 73 and 74 may be closed off, if desired. Thus, unnecessary waste of air may be avoided whenever certain cans can be dried at a shorter distance than the full length of the described blow channels, and to avoid any waste of air through the open ends of these channels above rods 80 a plate 89 is bolted to the floor 53 of the manifold 50 from which depend a pair of lugs 89a adapted to close the ends of said channels above said rods as shown in Fig. 7.

Figure 11:
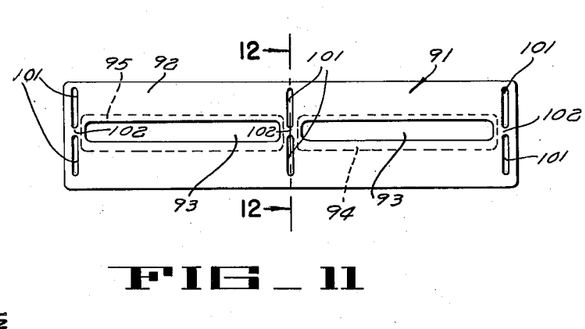
Fig. 11 is a plan view of one of the lateral blow nozzles.

Apart from the previously described opening 62 the floor 53 of the manifold 50 is provided with four additional apertures 90 and 90' of rectangular shape. These apertures are longitudinally co-extensive with, and are located at either side of, the initial portion 62a of the above mentioned opening 62 (Fig. 11).

Attached to the bottom of floor 53 in communication with said apertures 90 and 90' are two nozzles 91 and 91', respectively (Fig. 5). Each of these nozzles comprises a horizontal frame 92 surrounding apertures 93 of approximately the same length but of a materially smaller transverse width than the apertures 90 or 90', respectively. Two lips 94 and 95 depend vertically from the longitudinal edges of each aperture 93 as shown. The outer lip 94 is somewhat shorter than the inner lip 95 and has attached to its lower end an inwardly bent sheet or plate 96 extending obliquely to a point somewhat below and closely adjacent to the lower extremity of lip 95 which in turn may form an inwardly slanting edge 97. The lower extremities of inner lip 95 and bent plate 96 thus form a narrow inwardly inclined passage 98 as may be seen from Fig. 5.

Figure 12:
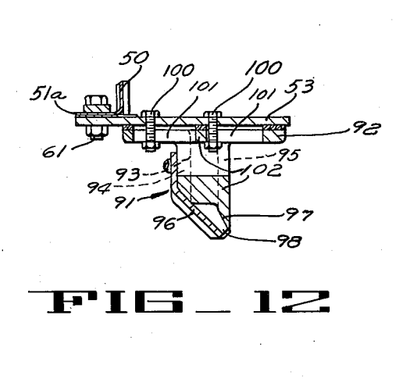
Fig. 12 is a cross section through the nozzle illustrated in Fig. 11 taken along line 12—12 thereof and showing part of the surrounding structure.

In order that the passages 98 at either side of the entrained cans may be positioned as closely as possible to the top and bottom walls thereof whatever their heights may be, means are provided to vary the relative position of the nozzles 91 and 91' in transverse direction. For this purpose the nozzles are attached to the bottom of the floor 53 by bolts 100 which engage transversely elongated slots 101 (Fig. 12) provided in the frame 92 of each nozzle and arranged in pairs positioned at either side of the aperture 93 as may be clearly seen in Fig. 11. To provide maximum transverse adjustment for a frame of a relatively limited transverse width, these slots are arranged to overlap the nozzle passage and for this purpose the continuity of the intake aperture 93 is interrupted by a number of bridges 102 extending transversely from lip to lip at the ends and in the middle of said aperture as likewise shown in Fig. 11. These bridge are of a hollow construction to afford access to the lower ends of the screw bolts 100 and the nuts applied thereto as may be seen from Fig. 12. It should be noted, however, that the bridges 102 do not extend downwardly over the full vertical depth of the nozzle passage but terminate at a level not lower than the lower extremity of the shorter lip 94 so that the continuity of the actual blow orifice 98 is preserved.

When the described apparatus is to be used in practice its motor 23 is switched on turning the chain belt 10 in clockwise direction, as viewed in Fig. 2, and the motor 38 may also be switched on to turn the carrier belts 25 in opposite direction. In addition the air blower 55 is set in operation to deliver air of room temperature into the manifold 59.

Figure 13:
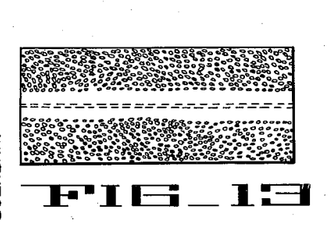
Figs. 13, 14, and 15 are developed can surfaces illustrating progressively the effect of the air blasts produced by the apparatus of the present invention upon droplets clinging to the can surfaces.
Figure 14:
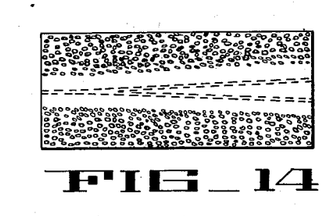
Figure 15:
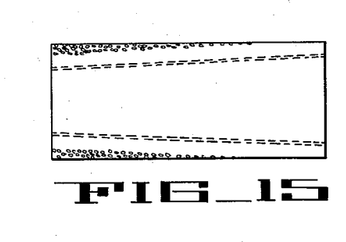

With the chain belt 10 in rotation, its rods 11 will successively collect cans from the end of the supply trough 40 and roll them upon base plate 41 onto the horizontal runs of the carrier belts 25. As soon as the cans leave the plate 41 and come into contact with the carrier belts 25, the counterclockwise movement of these belts (as viewed in Fig. 2) will cause them to spin at a rapid rate in clockwise direction. At the same instant a sheet of air emitted from the blow slot 66 directly above will strike the center of the cans and clear a narrow belt extending centrally around their bodies of any water droplets as illustrated in Fig. 13. As the cans advance under the propelling force of the rods 11, they reach the bifurcation point of the blow slot or nozzle 66 and move into the space underneath the gradually diverging slots or nozzles 73 and 74. The diverging sheets of air thrown against the surfaces of the cans from these slots drive the water droplets gradually toward the ends of the cans and thus clear an expanding path around the can bodies as indicated in Fig. 14 until all moisture is eventually blown over and away from the edges of the cans as illustrated in Fig. 15.

Figure 4:
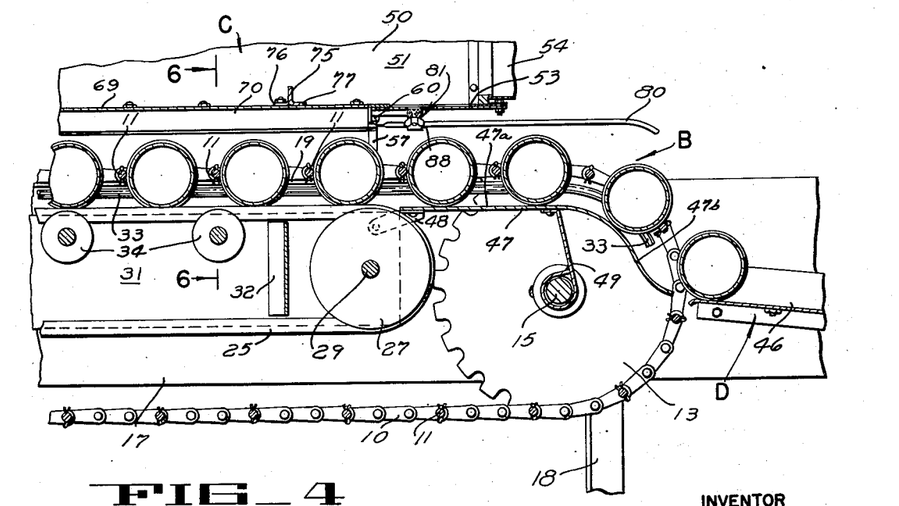
Fig. 4 is a section of a portion of the discharge end of the apparatus taken along line 4—4 of Fig. 1.

Further advance of the rods 11 now carries the dry cans from the spinning belts 25 onto base plate 47 and finally drops them onto the discharge trough 46 as illustrated in Fig. 4.

It should here be noted that the transverse width of the blow slots may vary depending upon the size of the cans for which a machine may be designed, and also upon the air pressures employed, and I have found that orifices of a width of from $\frac{1}{16}$ to $\frac{3}{16}$ of an inch will usually deliver very satisfactory results.

The rapid rotation of the cans as provided by the movement of the carrier belts 25 is instrumental in materially shortening the time and distance of travel otherwise required to dry the can bodies by means of the described air blasts. This permits shortening of the diverging air slots 73 and 74 by insertion of the previously described adjustment rods 80 and results in a noticeable saving of the energy expended upon the production of the air blasts. In case of products of a non-fragile nature such as fruit juices I have found it very advantageous to so adjust the rotational speed of the carrier belts 25 as to spin the cans at a rate of 1000 R. P. M. However, cans containing fragile products such as tomatoes, apricots and the like do not stand such rotations and may have to be passed through the drying installation with the carrier belts 25 in stationary condition or moving at very slow rates only. In such instances the cans will have to be exposed to the drying air blasts for a materially longer time and/or over a materially longer distance than is required when the cans are spun at great speeds, and for this purpose the cans may have to be exposed to the drying currents over the total available length of the blow slots 73 and 74 and it may even be necessary to reduce the speed of the drive belt 10. I have found that in order to dry cans dependably when they are merely rolled through the described drying installation without forced rotation, it is necessary to make the initial blow slot 66 about as long as the circumference of a can to be processed while the diverging blow slots 73 and 74 should at least be three times as long as the can circumference.

While the sheets of air directed from slots 66, 73, and 74 against the bodies of the cans passing underneath remove all moisture from the cylindrical surfaces thereof, the laterally positioned blow nozzles 91 and 91' throw oblique sheets of air against the end walls of said cans driving all moisture clinging thereto downwardly away from these walls until they are dry. For maximum effectiveness I have found that the lateral nozzles 91 and 91' should be so arranged as to produce a downwardly inclined sheet of air that hits the can walls at an angle of about 45 degrees and the ends of the nozzles should be positioned as closely to the can walls as is possible without obstructing the advance of the can procession. They may in fact serve as lateral guides for said cans as shown in Fig. 5.

By directing carefully predetermined currents of air against the body and the ends walls of a procession of advancing cans, the described arrangement is adapted to dry these cans within a very short time without raising their temperature and with a minimum of energy expended upon the production of these air currents. Thus, operation of an installation of the type described which will dry 300 cans per minute at room temperature requires air pressures of only 10 to 15 inches of water which may be generated by a blower operating with as little as from 3 to 6 H. P., and if the temperature of the air currents employed may be higher than room temperature and/or if the contents of the cans permit spinning, even less power may be required to dry a greater number of cans at a shorter time and over a shorter distance.

While I have explained my invention with the aid of a specific example thereof, it will be understood that many of the constructional details shown and described may be modified without departing from the spirit and scope of my invention. Thus, a sequence of parallel blow slots spaced successively increasing distances apart may be employed in place of the gradually diverging blow-slots with nearly the same effect. Furthermore, the solitary slot in the initial portion of the manifold floor may be made of gradually increasing width instead of having uniformly parallel edges so that the amount of air thrown against a can passing underneath will increase as the can advances toward the bifurcation point of the blower arrangement. Also, while I prefer the diverging blow orifices to be of such construction as to emit the air in a somewhat inwardly inclined direction, as shown, because this arrangement seems to dry the central portions of the cans better than any other arrangement, very satisfactory results may be obtained by orifices constructed in such a manner as to emit the air in an exactly vertical or even a slightly outwardly inclined direction.

Having thus described my invention, what I claim as new and desire to protect by Letters Patent is:

1. The method of drying the peripheral surface of a wet container, which comprises directing the apex of a pair of diverging sheets of air against the peripheral surface of said container at a point intermediately of its opposite end walls, said sheets of air being of sufficient force to displace water droplets adhering to said surface, effecting relative movement between said sheets of air and said container in a direction substantially perpendicular to its center axis and substantially within the symmetrical plane of said sheets, and rotating said container about its center axis.

2. The method of drying a wet container, which comprises directing the apex of a pair of diverging sheets of air against the peripheral surface of said container at a point intermediately of its opposite end walls, effecting relative movement between said sheets of air and said container in a direction substantially perpendicular to its center axis and substantially within the symmetrical plane of said sheets, rotating said container about its center axis, and directing additional sheets of air obliquely against its end walls.

3. The method of drying the peripheral surface of a wet container, which comprises directing the apex of a pair of inwardly slanted diverging sheets of air against said peripheral surface at a point intermediately of its end walls, said sheets of air being of sufficient force to displace water droplets adhering to said surface, and effecting relative movement between said sheets of air and said container in a direction substantially perpendicular to its center axis and substantially within the symmetrical plane of said sheets of air.

4. Apparatus for drying wet containers comprising a conveyor for moving a procession of containers along a rectilinear path with their center axes parallel to one another and transverse to said path; a manifold having a floor disposed above said path, said floor having a first slot in vertical alignment with the center line of said path and a pair of second slots diverging gradually in the direction of movement of said conveyor from the end of said first slot remote from the point of entry of the containers, said slots being adapted to emit downwardly directed sheets of air; and a pair of nozzles communicating with said manifold arranged at either side of and longitudinally co-extensive with said first slot, said nozzles being adapted to emit downwardly directed inwardly slanting sheets of air.

5. Apparatus for drying wet containers comprising a conveyor for moving a procession of containers along a rectilinear path with their center axes parallel to one another and transverse to said path; a manifold having a floor disposed above said path, said floor having a first slot in vertical alignment with the center line of said path and adapted to emit a downwardly directed vertical sheet of air and a pair of second slots gradually diverging in the direction of movement of said conveyor from the end of said first slot remote from the point of entry of the containers and adapted to emit downwardly directed and inwardly slanting sheets of air against the peripheral surfaces of the container procession underneath; a pair of nozzles in communication with said manifold arranged at either side of and longitudinally co-extensive with said first slot, said nozzles being adapted to emit downwardly directed and inwardly slanting sheets of air against the side walls of said containers; and means associated with said conveyor for rotating said containers about their center axes.

6. Apparatus for drying containers comprising diverging elongated nozzles arranged to eject inwardly slanting sheets of air against the containers, and means for moving the containers through said sheets of air in the direction of divergence of said nozzles and along a path parallel to the symmetrical axis of said nozzles.

7. Apparatus for drying cans comprising means for moving a procession of cans along a predetermined path, a manifold having a floor disposed above said path, said floor having a pair of gradually diverging slots having their symmetrical axis vertically aligned with the centers of said cans and adapted to direct sheets of air from said manifold against said cans, nozzles in communication with said manifold arranged at either side of said path and adapted to direct oblique sheets of air from said manifold against the ends of said cans, and means for adjusting the vertical position of said manifold relative to the path of movement of said cans.

8. The method of drying the outer surface of a container of the type having an enclosing side wall and two end walls provided at the opposite ends of said side wall, which comprises effecting relative movement of the container and the apex of a pair of sheets of air directed against the outer surface of the container side wall and arranged in diverging planes, with said apex maintained intermediately of the planes defined by said end walls during said movement until said diverging sheets of air intersect the opposite ends of said enclosing side wall and drive the droplets of moisture adhering to the outer surface of the container side wall over the opposite ends thereof.

9. Apparatus for drying wet containers, comprising means for moving a procession of containers along a rectilinear path, a downwardly directed elongated nozzle disposed above and extending in substantially parallel relation with the center line of said path, a pair of downwardly directed nozzles diverging symmetrically in the direction of movement of said containers from the end of said first mentioned nozzle remote from the point of entry of the containers, and means for forcing air through said nozzles against said containers.

WELLS A. WEBB.

REFERENCES CITED

The following references are of record in the file of this patent:

UNITED STATES PATENTS

| Number | Name | Date |
|---|---|---|
| 1,140,873 | Carter | May 25, 1915 |
| 1,279,086 | Davoran | Sept. 17, 1918 |
| 1,555,431 | Murphy | Sept. 29, 1925 |
| 1,645,005 | Hothersall | Oct. 11, 1927 |
| 1,697,879 | Olson | Jan. 8, 1929 |
| 1,753,176 | Stevens | Apr. 1, 1930 |
| 1,759,804 | Pieron | May 20, 1930 |
| 2,073,669 | Zademach | Mar. 16, 1937 |
| 2,132,303 | Lathrop | Oct. 4, 1938 |
| 2,142,001 | Minaker | Dec. 27, 1938 |
| 2,177,016 | Brizard | Oct. 24, 1939 |
| 2,330,124 | James | Sept. 21, 1943 |
| 2,359,088 | Croft | Sept. 26, 1944 |
| 2,402,545 | Frum | June 25, 1946 |